O. H. AMES.
JACK.
APPLICATION FILED MAR. 31, 1910.
983,419.
Patented Feb. 7, 1911.
Fig. 1.
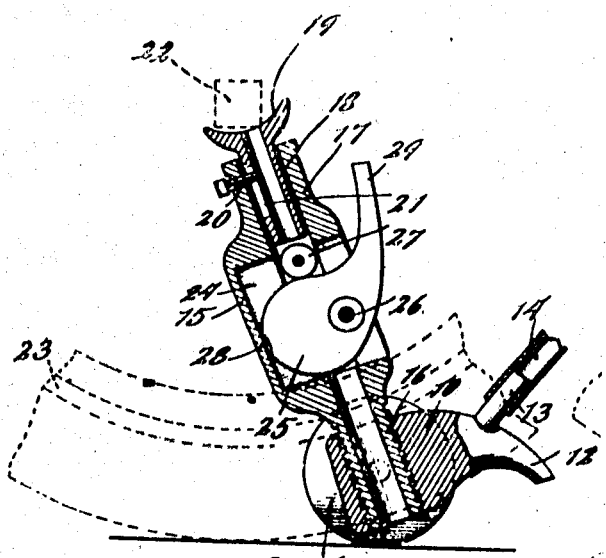
Fig. 2.
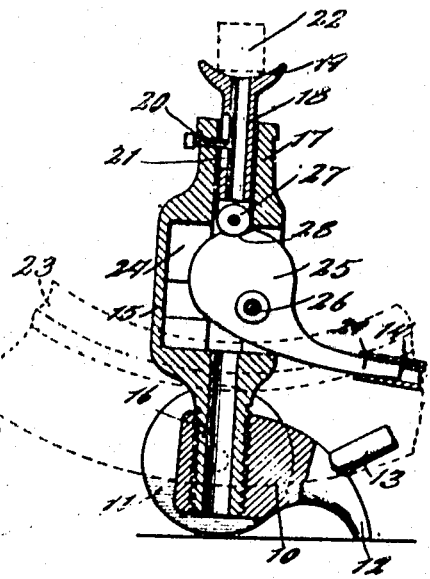
Fig. 3.
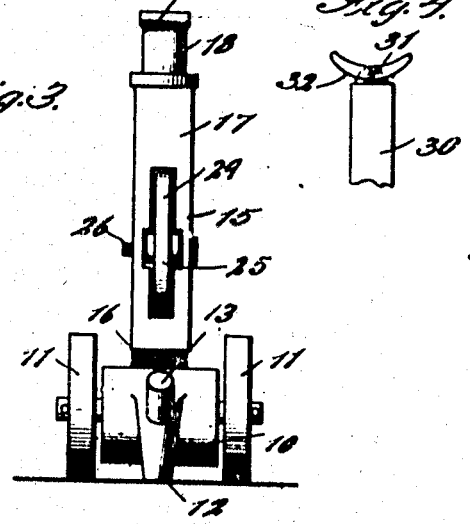
Fig. 4.
Fig. 5.
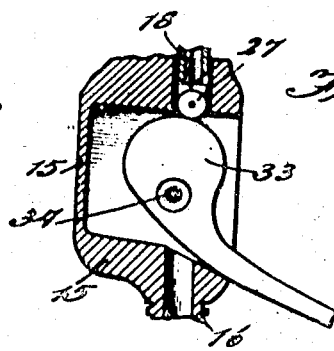
Witnesses:
Inventor:
Oscar H. Ames

UNITED STATES PATENT OFFICE.

OSCAR H. AMES, OF COAL HILL, PENNSYLVANIA, ASSIGNOR OF ONE-HALF TO ROBERT McCALMONT, OF FRANKLIN, PENNSYLVANIA.

JACK.

983,419.   Specification of Letters Patent.   Patented Feb. 7, 1911.

Application filed March 21, 1910. Serial No. 550,619.

*To all whom it may concern:*

Be it known that I, OSCAR H. AMES, a citizen of the United States, residing at Coal Hill, in the county of Venango and State of Pennsylvania, have invented certain new and useful Improvements in Jacks, of which the following is a specification.

My invention relates to a jack and has for its object to provide certain new and useful improvements in devices of this sort to be hereinafter described and claimed.

The jack of my invention is intended particularly for use in connection with automobiles, although obviously it might be put to other uses, and with this particular use in view, it is one of my primary objects to provide a device of simple and economical construction which can be readily applied to one end of an automobile axle and operated almost instantaneously to lift the adjacent wheel to a considerable distance from the ground, far enough, for instance, so that if the tire of the wheel be punctured or otherwise injured, and deflated, it may be removed from the rim and repaired, or a new tire put on in its place.

A further object of the invention is to provide a jack so constructed that the lifting operation may be accomplished in two successive steps; the load being raised a certain distance by a rocking movement of the device, or part of the device, on a rolling or otherwise movable fulcrum, the load being given thereupon a further elevation by a relative movement between parts of the device so rocked—this arrangement giving the jack the capacity to elevate the load for a considerable distance by movements which are quickly performed.

The invention has for further objects the several novel combinations of parts to be hereinafter fully described and claimed.

The invention is illustrated in a preferred embodiment in the accompanying drawings, wherein—

Figure 1 is a longitudinal sectional view showing the device as first applied to the axle of an automobile or other vehicle. Fig. 2 a similar view illustrating the position of the parts after both lifting operations have been performed. Fig. 3 is an end elevation. Fig. 4 a modification showing a preferred form of pillow or axle support, and Fig. 5 a fragmentary sectional view showing a modified construction of the lifting cam.

Like characters of reference indicate like parts in the several figures of the drawings.

Referring to the drawings, 10 represents a base or carriage provided on either side with the wheels or rollers 11 and at the back with the foot 12 from which projects, preferably, the stud 13 adapted to be engaged by the hollow end of a lever 14.

15 is a standard which is preferably adjustably mounted on the base 10. The standard may, for example, have a threaded opening therein to receive the threaded stem 16 of the standard. The standard 15 terminates at the upper end in a socket 17 in which is movably mounted a supporting device 18 provided with the pillow or axle support 19. The supporting device 18 may be held from accidental detachment by means of a set screw 20 which is threaded through the socket 17 and extends into a slot 21 in the supporting device.

The axle to which the jack is applied is shown at 22 and the adjacent wheel at 23.

The standard 15 has the central opening or slot 24 in which is the lifting cam 25 pivoted at 26, the cam bearing against the end of the supporting device 18, which is preferably provided at this point with the anti-friction roller 27. The roller 27 and the cam 25 are engaged at the elevated position of the supporting device. This engagement may be effected by notching the perimeter of the cam, as shown at 28.

As providing a simple means for rotating the cam 25, it is formed preferably with a stem 29 which has the same diameter as the stud 13. If this be the case the lever 14 may be first used on the stud and afterward employed to rotate the cam.

The device for supporting the axle may be constructed as shown in the first three figures, but a preferable construction is shown in Fig. 4 in which the support consists of a stem 30 formed on the top with a lug 31 on which is pivoted the rocking pillow 32.

While the engagement of anti-friction roller 29 with the notch 28 of cam 25 is, under ordinary circumstances, sufficient to keep the parts in their extended or lifting position, regardless of the location of the pivotal point 26, this engagement may be made surer by locating the pivotal point of the cam forward of the axial line of the device. This arrangement is shown in Fig. 5 in which the cam 33 is pivoted at the point 34. In this arrangement the cam obviously need not be notched.

As the device, as shown and described, might be modified in certain respects without departure from the purpose and scope of my invention, I do not limit myself to the particular devices, construction, arrangements and proportion of parts shown, except so far as these particulars are made limitations on certain of the claims herein.

The operation of the device is as follows: Supposing the jack is to be used for elevating the wheel of an automobile, the tire of which has become punctured or otherwise injured and is consequently deflated, the jack is placed against the axle of the automobile in the oblique position shown in Fig. 1. By means of the lever 14 which is engaged with the stud 13, the device may be rocked and pushed forward, the wheels 11 constituting a movable fulcrum for the device. Preferably, the diameter of the wheels 11 and the length of the foot 12 are so proportioned that when the foot comes into contact with the ground, the standard 15 is tilted so that the axle support or pillow 22 is effectively between the support afforded by the wheels 13 and the foot, the stability of the jack being assured by this arrangement of the parts. The lever 14 is then removed from the stud 13 and is put over the end of the stem 29 of lifting cam 25. By a single movement of this lever the supporting member 18 is raised. It is held in the elevated position by the engagement of the anti-friction roller 27 with the notch 28 in the periphery of the cam. In the arrangement shown in Fig. 5 the same result is obtained, whether the cam be notched or not, by the position of the pivotal point of the cam.

By means of a jack constructed as described above, it will be seen that the load, the automobile or whatever it may be, may be elevated a very considerable distance by movements which are very simple and can be quickly performed. The amount of elevation that can be obtained by the rocking of the device as a whole on its movable fulcrum is practically limited, as it is not feasible to apply the jack to the axle at a very oblique angle. On the other hand, there are practical limitations to the range of movement that can be obtained in a device of this sort by cam action. By combining the principle of using the device as a whole as a lever with the cam principle utilized to obtain an increase of elevation, a jack is provided which is cheap to manufacture, light and compact in its structure and which can be applied to the axle and operated almost instantaneously.

The use of the rocking pillow shown in Fig. 4 facilitates the proper seating of the axle on the jack. This device is not, however, specifically claimed herein, as it is so claimed in my co-pending application Serial No. 550618, filed March 21, 1910.

I claim:

1. A jack comprising in combination, a rocking base, wheels constituting a movable fulcrum for said base, a standard having a threaded engagement with said base, for the purpose of vertical adjustment, axle sustaining means movably mounted with respect to the standard, said base having a support other than said wheels which, when in contact with the ground, brings the point at which the axle is sustained between the wheels and said other support; and a cam for raising said axle sustaining means with respect to said standard.

2. A jack comprising in combination a rocking base, wheels constituting a movable fulcrum for the base, a standard on said base, axle sustaining means movably mounted with respect to said standard, a support on said base, other than said wheels, which is adapted to bear upon the ground and when in contact with the ground brings the point at which the axle is sustained between the wheels and said other support, said standard being formed with a slot, a cam pivoted in said slot having a stem which extends out of the slot, a lever adapted to be removably engaged with the stem of said cam, and means on said base adjacent the support thereon adapted to be similarly engaged by said lever, substantially as and for the purpose described.

3. A jack comprising in combination a rocking base, wheels constituting a movable fulcrum for said base, a standard which is vertically adjustable with respect to said base, axle sustaining means movably mounted with respect to the standard; said base having a support other than said wheels which, when it is in contact with the ground, brings the point at which the axle is sustained between said wheels and said other support; and a cam for raising said axle sustaining means with respect to said standard.

OSCAR H. AMES.

Witnesses:
CHAS. E. SHOUP,
ROBERT N. SPEER.